US009395697B2

(12) United States Patent
Turner

(10) Patent No.: US 9,395,697 B2
(45) Date of Patent: Jul. 19, 2016

(54) METHOD AND APPARATUS FOR CALCULATING TRANSMISSION DELAY ACROSS A NETWORK

(71) Applicant: QUALCOMM TECHNOLOGIES INTERNATIONAL, LTD., Cambridge (GB)

(72) Inventor: Richard Turner, Belfast (GB)

(73) Assignee: QUALCOMM Technologies International, LTD., Cambridge (GB)

( * ) Notice: Subject to any disclaimer, the term of this patent is extended or adjusted under 35 U.S.C. 154(b) by 863 days.

(21) Appl. No.: 13/661,769

(22) Filed: Oct. 26, 2012

(65) Prior Publication Data

US 2014/0122019 A1    May 1, 2014

(51) Int. Cl.
*G04F 10/00* (2006.01)
*G04R 40/06* (2013.01)
*G06F 15/00* (2006.01)

(52) U.S. Cl.
CPC ............... *G04F 10/00* (2013.01); *G06F 15/00* (2013.01); *G04R 40/06* (2013.01)

(58) Field of Classification Search
CPC .......... G04F 10/00; G04R 40/06; H04J 3/06; H04J 3/0614; H04J 3/0632; H04J 3/0635; H04J 3/0638; H04J 3/065; H04J 3/0685; H04J 3/0697
See application file for complete search history.

(56) References Cited

U.S. PATENT DOCUMENTS

| 2005/0041692 | A1 | 2/2005 | Kallstenius |
| 2009/0163246 | A1 | 6/2009 | Mullen |
| 2010/0020909 | A1 | 1/2010 | Jung et al. |
| 2013/0003757 | A1* | 1/2013 | Boatright ............. H04J 3/0697 370/474 |
| 2013/0128903 | A1* | 5/2013 | Kristoffersen ........ H04J 3/0658 370/503 |

FOREIGN PATENT DOCUMENTS

EP    1 785 802 A1    5/2007

OTHER PUBLICATIONS

GB Search Report issued in related GB Application No. GB1318768.7, dated Apr. 16, 2014.

* cited by examiner

*Primary Examiner* — Toan Le
(74) *Attorney, Agent, or Firm* — The Marbury Law Group, PLLC

(57) ABSTRACT

A method of calculating a transmission delay value for data transmitted from a first device to a second device across a communications link. The method involves calculating a plurality of measured values representing the transmission delay measured by the second device over time; detecting a minimum boundary of the measured values; and deriving the transmission delay value from the minimum boundary. The transmission delay value may be used to synchronize the clock signal of the second device to the clock signal of the first device.

46 Claims, 6 Drawing Sheets

METHOD AND APPARATUS FOR CALCULATING TRANSMISSION DELAY ACROSS A NETWORK

FIELD OF THE INVENTION

The present invention relates to the calculation of transmission delay across a network, especially a noisy network.

BACKGROUND TO THE INVENTION

To synchronize the rendering of media on multiple devices connected via a wired or wireless network, the local clock (slave clock) of each device is synchronized to a common reference clock (master clock). The master clock can be the clock of one of the rendering devices. The clock synchronization process requires each slave clock to calculate an estimate of the time of the master clock and of the time drift between itself and the master clock. The slave clock then removes the estimated clock difference between itself and the master clock. Both the master clock and the slave clock provide the local time information for a respective device.

Part of the synchronization process involves each device sending a one or more data packets containing the device's local time information. From the local time information, the time it takes for a packet to reach its destination in the network can be calculated. The time difference between a master clock and a slave clock as well as the drift between the two clocks can be calculated and used to adjust the slave clock to a value that matches or substantially matches the master clock.

A problem with the described method occurs when the communication link between the devices suffers from jitter in the transmission time between a source and its destination, which introduces noise into the system. Jitter can have multiple causes. One cause can be an obstruction to a wireless link, for example a person coming between a transmitter and a receiver communicating via a wireless link. Another cause can be the Operating System operation on low cost systems (for example an embedded platform that does not have a true RTOS and does not have support for network time stamps). Many other parameters can affect the jitter in the system.

To compensate for jitter and/or any problems having a similar affect, and to calculate an accurate value of the time difference and drift between two clocks, data filtering may be employed to extract transmission delay information from the noise in the system. This process slows down the time it takes for the delay between devices to be calculated accurately and the filtering introduces an offset in the system that impacts the synchronization accuracy.

To accurately synchronize a slave clock and a master clock located on two separate devices communicating via a wired or wireless network the minimum transmission delay between the device hosting the master clock and the device hosting the slave clock, as well as the drift between the two clocks involved, should be accurately and quickly computed.

SUMMARY OF THE INVENTION

A first aspect of the invention provides a method of calculating a transmission delay value for data transmitted from a first device to a second device across a communications link, the method comprising:
calculating a plurality of measured values representing the transmission delay measured by said second device over time;
detecting a boundary, especially a minimum boundary, of said measured values, wherein said boundary comprises at least one boundary value; and
deriving said transmission delay value from said at least one boundary value.

In typical embodiments, said first and second devices are co-operable with a respective clock signal, and said method may include using said transmission delay value to synchronize the clock signal of said second device to the clock signal of said first device.

In preferred embodiments, detecting said boundary involves determining a plurality of boundary values; fitting a model to said boundary values; and deriving said transmission delay value from said model.

Optionally, determining said plurality of boundary values involves selecting a sub-set of said measured values as said boundary values. Selecting said sub-set of values may involve selecting a plurality of said measured values depending on the rate of change of said measured values.

In preferred embodiments, the method includes selecting a plurality of said measured values depending on the rate of change of said measured values involves:
calculating the rate of change between a first measured value taken in respect of a first time and a second measured value taken in respect of a second time, said second time preceding said first time;
calculating the rate of change between said second measured value and a third measured value taken in respect of a third time, said third time preceding said second time;
comparing the respective calculated rates of change; and
excluding said second measured value from or including said second measured value in said sub-set depending on said comparison.

Optionally, determining said plurality of boundary values involves calculating said boundary values from said measured values.

Optionally, determining said boundary values from said measured values involves calculating each boundary value as a respective minimum value derived from said measured values. Determining said boundary values from said measured values may involve calculating each boundary value as a respective minimum value of a respective subset of said measured values.

Optionally, detecting said boundary involves updating a parameter value in respect of each of said measured values. Said parameter value may be set to the lower one of: the measured value in respect of a current measurement time; or said parameter value modified by application of a mathematical function.

A second aspect of the invention provides an apparatus for calculating a transmission delay value for data transmitted from a first device to a second device across a communications link, the apparatus comprising:
calculation means configured to calculate a plurality of measured values representing the transmission delay measured by said second device over time;
detection means configured to detect a boundary, especially a minimum boundary, of said measured values, wherein said boundary comprises at least one boundary value; and
derivation means configured to derive said transmission delay value from said at least one boundary value.

A third aspect of the invention provides a media system comprising a first device configured to transmit an audio and/or video data signal to a second device across a communications link, said second device comprising an apparatus for calculating a transmission delay value for said transmitted data, the apparatus comprising:
calculation means configured to calculate a plurality of measured values representing the transmission delay measured by said second device over time;
detection means configured to detect a boundary, especially a minimum boundary, of said measured values, wherein said boundary comprises at least one boundary value; and
derivation means configured to derive said transmission delay value from said at least one boundary value.

A fourth aspect of the invention provides a method of detecting, in a computer system, a boundary of a plurality of data values, wherein said boundary comprises a plurality of boundary value, said method including selecting a sub-set of said data values as said boundary values by:
calculating the rate of change between a first data value taken in respect of a first time and a second data value taken in respect of a second time, said second time preceding said first time;
calculating the rate of change between said second data value and a third data value taken in respect of a third time, said third time preceding said second time;
comparing the respective calculated rates of change; and excluding said second data value from or including said second data value in said sub-set depending on said comparison.

A fifth aspect of the invention provides an apparatus configured to perform the method of the fourth aspect of the invention.

Further preferred features of the invention are recited in the dependent claims.

Preferred embodiments advantageously provide a method for simultaneously and precisely computing the minimum, or true, transmission delay between multiple devices communicating via a network, as well as, optionally, the drift occurring between the instruments used to measure time on each device.

Although embodiments of the invention are described herein in the context of synchronizing clocks, the invention can be extended to any application requiring the knowledge of transmission delay between devices in a network.

Further advantageous aspects of the invention will become apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
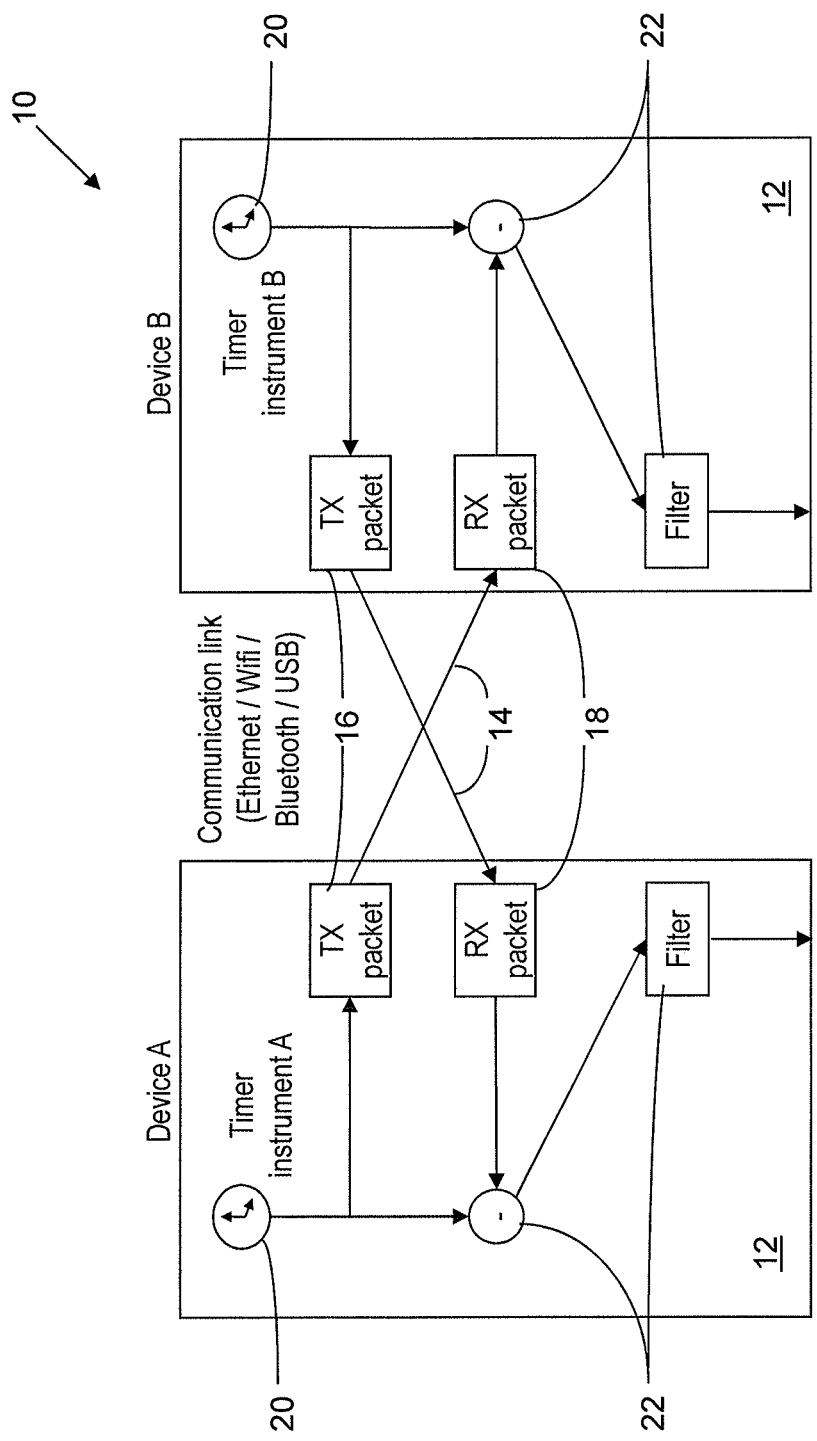
FIG. 1 is a block diagram of a communications system embodying one aspect of the present invention, in which devices communicate with one another across a communications link.

Referring now to FIG. 1 of the drawings, there is shown generally indicated as 10 a communications system in which a plurality of devices 12 (only two shown in FIG. 1 for illustrative purposes) are capable of communicating with one another across one or more wired and/or wireless communications links 14 support by a wired and/or wireless network. By way of example, links 14 may comprise any one or more of Ethernet, WiFi, Bluetooth or USB links.

Each device 12 may comprise any device that is capable of sending and/or receiving digital signals across the network 14. The data signals typically comprise the source data (sometimes referred to as the traffic data or the payload data) together with overhead data. Embodiments of the invention are particularly suited to instances where digital data signals are streamed across the links 14, for example comprising audio and/or video traffic data. In such cases, each device 12 may comprise a media processing device, for example an audio and/or video server and/or client. The devices 12 may be more generally referred to as computing devices.

In the present example it is assumed that the data signals comprise data packets, where each packet comprises traffic data and overhead data. Alternatively, the signals may be comprised of other data signal components, e.g. frames.

Each device 12 includes at least one transmitting module 16 and/or at least one receiving module 18. The transmitting module 16 is configured to send data signals to the receiver 16 of one or more other devices 12. Typically the transmitter 16 is configured to format the data such that it is suitable for transmission, for example creating the data packets. This may be referred to as encapsulation. The receiver 18 is configured to receive the data signals and to recover the traffic data by an appropriate de-encapsulation process.

Each device 12 includes a respective timing device 20 for generating a local timing (clock) signal from which the respective device 12 operates.

When a data signal is sent from one device 12 to another 12, the communication link 14 introduces a transmission delay, which may be affected by jitter or other noise inducing factors. In order to determine what the delay is, the transmitter 16 is configured to associate time information, commonly referred to as a time stamp, with each component of the data signal, the time information indicating the time at which the respective signal component was transmitted from the device 12 according to the respective clock 20 of that device. In this example, the time stamps are included in the respective header of respective data packets. The receiver 18 recovers the time information from received data packets and also records a received time with the respective packet, the received time corresponding with the time at which the packet was received by the receiving device 12 according to its respective clock 20. The receiving device 12 includes processing means 22 configured to determine the difference between the transmit time and the receive time of each packet, and to apply filtering to remove or at least reduce the affects of jitter or other noise. In particular the processing means may be configured to perform any one or more of the methods for determining transmission delay described hereinafter. The processing means 22 may conveniently be implemented by a suitably programmed computer, e.g. microprocessor.

In the following description, the term 'true' delay represents the transmission delay the system 10 causes between two devices 12 when the communication link 14 suffers from no disruption that adversely affects the transmission, e.g. jitter. The true transmission delay, which may be regarded as the minimum transmission delay between the two devices, is what it is desired to calculate.

Figure 2:
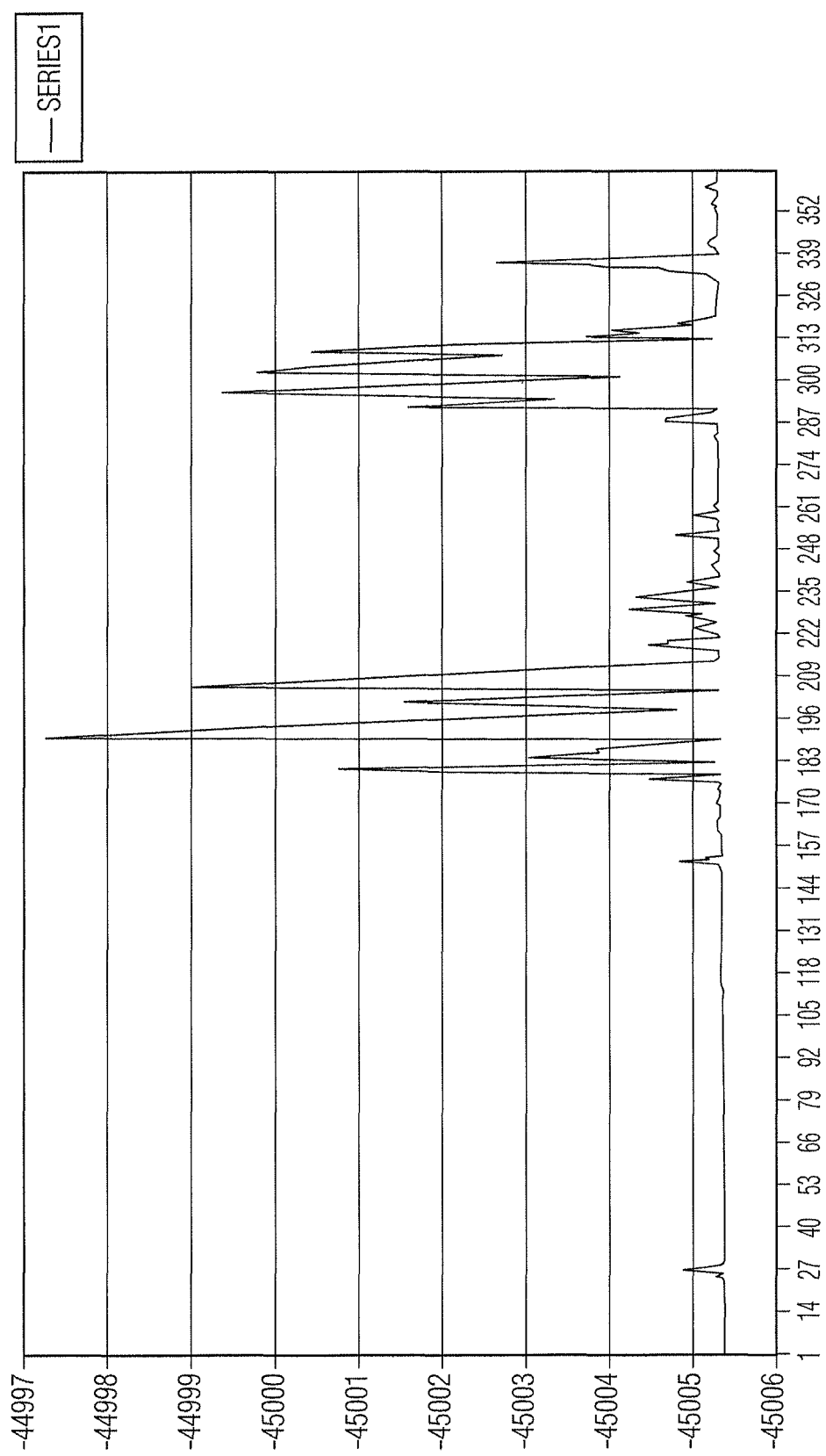
FIG. 2 shows a graph illustrating how inter-device transmission times can be affected by interference with a wireless communications link.

FIG. 2 shows how transmission delay measurements can be affected by disruptions, in this case by a person passing through the path of a wireless communications link. It can be seen that the effects of jitter can arise in bursts (represented by the peaks in the graph of FIG. 2), in which case measurements of the true delay can occur as little as one in one hundred measurements or even less often.

In conventional systems, transmission delay may be estimated using a PI (Proportional Integration) filter or a clustering filter. Such methods provide adequate results when most of the measurements are true delays, but when the jitter is of more erratic nature, e.g. when a person walks between two devices communicating over a wireless network, they do not perform well.

For the purposes of illustration, FIG. 1 shows two devices 12, designated as device A and device B communicating across a network (wired or wireless) via links 14. The respective clock 20 of each device 12 provides respective time information Ta and Tb to the respective device 12. Tb can be approximated in relation to Ta at any moment by a linear equation:

$$Tb(t)=C+d*Ta(t)$$

Where C represents an initial offset between Ta and Tb at the start of observation and d is a coefficient representing the drift of Tb from Ta over time. The device 12 measuring the transmission delay between a transmitting device 12 and itself may be considered a slave device while the transmitting device 12 may be considered the master device.

It is desired to measure the minimum (or nominal) transmission delay between device A and device B communicating via a wired or wireless network while at the same time estimating the drift between the respective clocks 20 used by device A and B to compute the delay. The minimum (or nominal) transmission delay may be defined as the minimum delay taken to transfer data across the network (e.g. across a link 14 between the respective transmitter 16 and receiver 18) between two respective devices 12, device A and device B in this example, when the network behaves in a perfect way (i.e. no delay caused by anything other than delays due to the implementation of the network itself).

It is assumed that any disruption in a transmission network always adds extra delay to data packets and that delay can never be subtractive, i.e. a packet cannot reach the other side of the link 14 before it is sent. Across a set of delay measurements captured over time, the minimum measured delay is the closest to the true delay of the network and any other higher measured delays are assumed to be due to noise in the system. Preferred embodiments of the invention implement a method of finding the transmission delay closest to the true delay in a set of delay measurements. Although described herein in the context of two devices A and B, embodiments of the invention may involve a system having two or more devices (master or slave).

In this illustration, $T_{network}$ is the ideal transmission delay of data in the network measured by the same ideal timer instrument (clock) on both devices 12. In this context "ideal transmission" means that the communication network, or more particularly the respective link 14, suffers from no disruption of any form in the flow of transmission.

If $T_{true}$ is the true transmission delay of a data packet and $T_{meas}$ is the measured delay then a linear approximation of $T_{meas}$ can be given as:

$$T_{true}=T_{network}d*t+C$$

$$T_{meas}=T_{true}+N$$

Where N represents random noise of unknown distribution, C represents an initial offset between the clocks 20 of the two devices 12 (slave and master) and d is the drift between the clocks used by the slave and master device 12.

It is desired to extract ($T_{network}+C$) and d from the measurements of delay ($T_{meas}$). Methods of computing $T_{meas}$ are not described herein. This may be achieved in any convenient conventional manner, for example in accordance with the Precision Time Protocol (PTP) described in standard IEEE1588.

There is now described a preferred method of selecting when enough data is available to extract the true delay measurement from measurements affected by noise. In the following description, a valid measurement is a measurement that may be used by device B in the computation of a curve which best fits the true transmission delay of data between devices A and B.

Referring again to FIG. 2, it can be seen that the period between time 288 sec and 316 sec (28 sec) is the largest continuous time period where delay measurements are affected by noise and are therefore incorrect, i.e. do not represent the true delay. It is desired to bridge this disruption by estimating what the measurements should have been. For this example a set of measurements over a period greater than 28 sec are required so that it can be assumed that at least two points (one from each side of the disruption) in the set are not affected by noise. This period of time may be referred to generally as $T_{age}$. In preferred embodiments, a set of delay measurements used to compute an estimate of the true delay is considered valid only if at least one of the measurements in the set is older than $T_{age}$ (i.e. was captured at least $T_{age}$ before the current time). The length of $T_{age}$ may vary from application to application, but way of example it is found that $T_{age}$=60 seconds is effective. The value of $T_{age}$ may be calculated from the measured delay values, in particular as the time between two measured delay values that are determined to be true delay values and which are deemed to bridge a period of disruption. The value of $T_{age}$ may be updated during transmission of data between devices 12.

Figure 3:
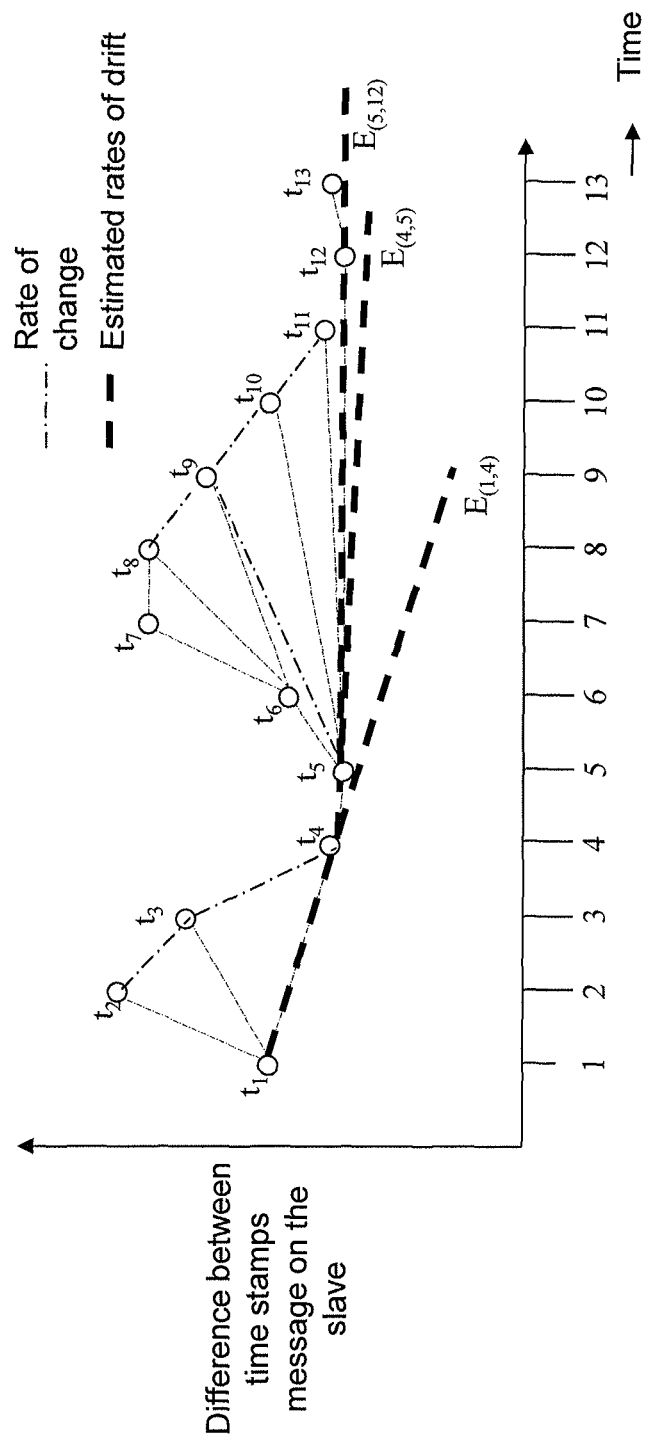
FIG. 3 is a graph illustrating how true transmission delay can be estimated from transmission delay measurements.

FIG. 3 shows an example of measurements $t_1$ to $t_{13}$ of the transmission delay ($T_{meas}$) made by device B receiving data from device A. The measured values can vary significantly from one measurement to the next due to many factors.

It can be seen that the sub-set of measurements $t_1, t_4, t_5, t_{12}$ and $t_{13}$ define a bottom envelope of the full set of measurements. It can also be seen that points $t_1$ and $t_4$ as well as points $t_5$ and $t_{12}$ bridge a respective period of disruption (in that measurements $t_2$ to $t_3$ and points $t_6$ to $t_{11}$ are deemed to have been affected by noise/jitter). Therefore for this set of measurements, the value of $T_{age}$ would need to be greater than 7 otherwise the calculation of the true delay is susceptible of being affected by the disruption shown.

Measurements $t_1, t_4, t_5, t_{12}$ and $t_{13}$ are considered to be "inflection points" as each measurement represents a change in the rate of drift between the respective clocks 20 used to measure the transmission delay. These measurements form a subset of the full set of measurements and track the bottom envelope of the measurements at time t=13.

On FIG. 3 three broken lines $E_{(1,4)}$, $E_{(4,5)}$ and $E_{(5,12)}$ represent respective estimate (mathematical) models, linear models in this case, from which estimates of the true delay can be taken, the models being generated from the inflection points, in this example respective pairs of inflection points $t_1$ and $t_4$, $t_4$ and $t_5$, and $t_5$ and $t_{12}$. The gradient of the lines E can be used as an estimate of the drift d between the respective clocks.

A preferred method of selecting an estimate model at any time t is to select the model defined by the newest set of two adjacent inflection points where at least one of the inflection point measurements is older than the relevant $T_{age}$ value. For example, for the data of FIG. 3, if $T_{age}$ is set to 8 and the current time is equal to 9 then only the inflection point $t_1$ is considered to be old enough to be accepted as true measurement, and as $t_1$ and $t_4$ form a set of two adjacent inflection points that has one of its points old enough, then this set can be used to define the model for estimating the true delay, namely the value on line $E_{(1,4)}$ at time t.

At time t=12, $t_4$ is considered old enough to be used in the set of inflection points (along with $t_5$) to define the estimate model and so to compute the true delay estimate. Therefore $E_{4,5)}$ is used to estimate the true delay at t=12. At time t=13, $t_5$ is considered old enough to be part of the set of inflection points (along with $t_{12}$) and so may be used to compute the estimate of true delay via line $E_{(5,12)}$, which bridges the disruption seen between point $t_5$ and point $t_{12}$.

The set of inflection points tracks, or detects, a bottom envelope (or minimum boundary) of the delay measurement data over time. The contents of the set changes over time as new points are added and previous points are checked and removed if no longer valid. A first method of maintaining the set of inflection points and so detecting the bottom envelope defined by the measured delay values is now described with reference to FIG. 4.

In preferred embodiments, it is assumed that drift between clocks is constant (and can therefore be represented rectilinearly) over a short time period $T_{max}$ but that it may change over a longer period. Therefore inflection points are removed from the set if they are older than a time $T_{max}$ from the current time (where $T_{max} > T_{age}$). This provision limits the complexity of the maintenance of the inflection points and subsequent computations based on them, and also removes events from the past that may not be relevant to the present.

A set of delay measurement values are considered, comprising the two most recent, not deleted, existing inflection points (which are assumed to have been taken at times $t_x$, $t_y$ respectively) and a new measurement value taken at time $t_z$, where $t_x$ is older than $t_y$ and $t_y$ is older than $t_z$. Any time a value in this subset changes a checking process is performed to determine if the inflection points currently available for computation of the estimate of the true delay are still part of the bottom envelope. When a new measurement is taken at time $t_n$ it is added to the set such that it becomes $t_z$ (FIG. 4, 401) The rate of change ($\nabla(t_y,t_z)$) between the second newest point of the set ($t_y$) and the new measurement ($t_z$) is compared to the rate of change ($\nabla(t_x,t_y)$) between the second and third newest point of the set (i.e. $t_x$ and $t_y$), (FIG. 4, 402, 403) where:

$\nabla(t_y,t_z)$ is $(T_{meas}(t_z)-T_{meas}(t_y))/(t_z-t_y)$
and $\nabla(t_x,t_y)$ is $(T_{meas}(t_y)-T_{meas}(t_x))/(t_y-t_x)$
and $T_{meas}(t_n)$ is the delay measurement at time $t_n$.

Figure 4:
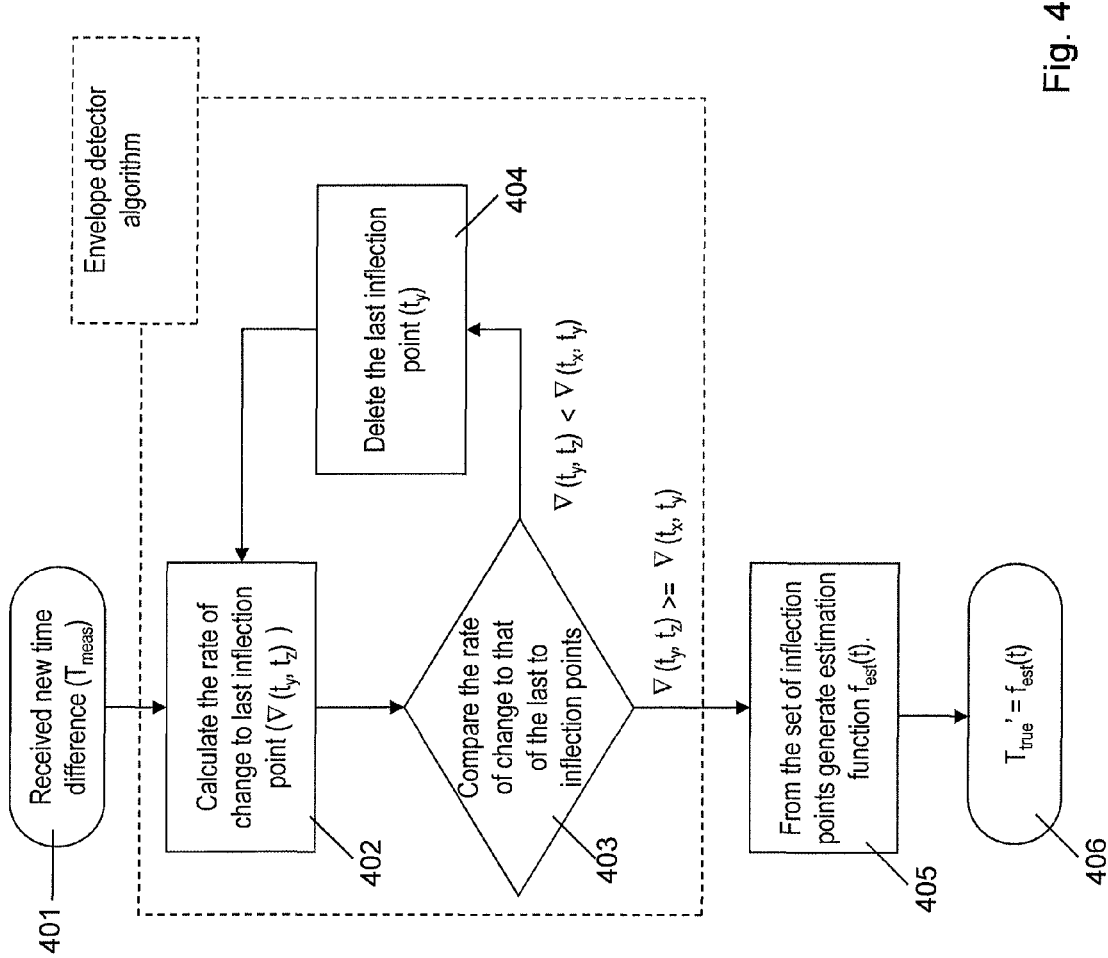
FIG. 4 is a flow chart illustrating a first method of calculating transmission delay embodying one aspect of the invention.

If $\nabla(t_y,t_z)$ is lower than $\nabla(t_x,t_y)$ then $t_y$ is deemed not to be on the envelope (i.e. it does not represent a possible estimate of the true delay of the system) and is removed from the set (FIG. 4, 404). When assessing whether respective changes in measurement are lower or higher than one another, the sense (i.e. whether it is positive or negative) of the change (gradient) is taken into account as well as its magnitude.

This process is repeated taking the last three points in the set of inflection points until $\nabla(t_y,t_z)$ is greater or equal than $\nabla(t_x,t_y)$ at which stage the set of inflection points is assumed to be correct for the time up until the most recent measurement at $t_n$. In each iteration, the measurement value for time $t_z$ is the same, but the values for $t_x,t_y$ change with each deletion of a $t_y$ value since the value that was at $t_x$ becomes the value at $t_y$ and the value that was at $t_{x-1}$ becomes the value at $t_x$. The set of inflection points may be initialized with the first two measured delay values, each measured value thereafter causing the above method to be perfumed.

By way of example, the envelope detection method of FIG. 4 is now applied to the measurement set of FIG. 3. Starting with the measurements at $t_1$ and $t_2$, when a new measurement ($t_3$) is added to the set then the $t_1$, $t_2$ and $t_3$ measurements form the subset $t_x$, $t_y$ and $t_z$. It can be seen from the figure that the line from $t_1$ to $t_2$ (positive gradient) is steeper than the line $t_2$ to $t_3$ (negative gradient) and a line between $t_1$ to $t_3$ can bridge the gap. So $t_2$ is removed.

When $t_4$ is added, the subset becomes the group of measurements at time $t_1$, $t_3$ and $t_4$. From FIG. 3 it can be seen that the line between $t_1$ to $t_3$ is steeper than the line $t_3$ to $t_4$ and a line between $t_1$ to $t_4$ can bridge the gap, so $t_3$ is removed. When $t_5$ is added the subset becomes the group of measurements at time $t_1$, $t_4$ and $t_5$ and from FIG. 3 it can be seen the line between $t_1$ to $t_4$ is not as steep (i.e. not as positive a gradient (or less negative a gradient)) as the line $t_4$ to $t_5$ and a line between $t_1$ to $t_5$ cannot bridge the gap. So no point is removed from the set of inflection points.

The process is iterated until the measurement delay at time $t_9$ is captured. At this stage the set of "inflection points" contain the points $t_1,t_4,t_5,t_6,t_8$ and $t_9$. The subset that needs checked is made up of $t_6,t_8$ and $t_9$. From FIG. 3 it can be seen that the line between $t_6$ to $t_8$ is steeper (i.e. has a more positive gradient) than the line $t_8$ to $t_9$ so a line between $t_6$ to $t_9$ can bridge the gap and therefore $t_8$ is removed from the set. As the subset ($t_x$, $t_y$, $t_z$) has now changed (i.e. $t_8$ has been removed and the next oldest point $t_5$ has been added to the set) the subset of inflection points has to be rechecked. From FIG. 3 it can be seen that a line from $t_5$ and $t_9$ bridges the gap so $t_6$ is removed. The process is repeated for $t_4,t_5$, and $t_9$ but in this case the line between $t_4$ to $t_5$ is not as steep (less positive or more negative gradient) as the line between $t_5$ to $t_9$ and therefore the line between $t_4$ to $t_9$ cannot bridge $t_5$. Using the same logic it can be seen that $t_{10}$ will replace $t_9$, $t_{11}$ will replace $t_{10}$, $t_{12}$ will replace $t_{11}$ but $t_{12}$ cannot be bridged by a line between $t_5$ and $t_{13}$ so the process results in the set of inflection point being composed of $t_1,t_4,t_5,t_{12}$ and $t_{13}$.

The process described above is performed in respect of all measurements considered to be valid, and part of the set of inflection points is used to create a curve, or model, representing an estimate of the true transmission delay and from which an estimate of true transmission delay can be made at any time t.

In preferred embodiments, an estimate of the true delay at time t is generated from a projection, preferably a rectilinear projection, of the rate of change between the newest set of two adjacent estimates that has at least one point older than the $T_{age}$ threshold. Hence, selected valid measurements are used to compute a curve, or model, that best fits them and the equation of the curve, or model, is used to predict the true delay at the current time of the system (FIG. 4, 405, 406).

In the illustrated example where a straight line is fitted to the newest set of two adjacent inflection points ($t_{i-1}$, $t_i$) where at least one of the measurements is older than the $T_{age}$ threshold, a model $f_{est}(t)$ of the straight line can be defined as follows:

$$f_{est}(t) = C_t + d^*(t-t_{i-1})C_t = T_{meas}(t_{i-1}),$$

$$d = \nabla(t_{i-1}, t_1)$$

$C_t = T\text{network} + C$ Hence, $(T_{network} + C)$ and $d$ can be calculated.

The method may be implemented using a table that contains the time of the measurement ($t_n$), the value at the measurement ($T_{meas}$) and computed slopes ($\nabla(t_m, t_n)$ where $t_m$ and $t_n$ are adjacent "inflection points").

In the present illustration, a straight line, or rectilinear model, is fitted to the two selected inflection points. Alternatively any other form of model (e.g. a quadratic equation, cubic spline approximation and so on) may be used.

Computation of a running average of the measured delay, for example using an FIR filter, can be used to estimate the drift trend, or otherwise determine the drift between clocks, and this facilitates deciding whether or not to make a measurement point valid.

An alternative method of tracking, or detecting, a bottom envelope of measured transmission delay values is now described with reference to FIG. 5. A parameter DELAY is maintained that has a value equal to the minimum one of the current measured value of transmission delay (MEASURED) and a value computed via a transform function f( ) applied to DELAY:

$$DELAY(t) = MIN(f(DELAY(t-1)), MEASURED(t)).$$

The transform function f( ) increases the value of the delay parameter to handle cases where a drift between the timer instruments of devices A and B exists. DELAY represents an approximation of the true $T_{true}$ transmission delay between device A and device B.

The function f( ) can be implemented using a wide range of formula. Examples of how to implement f( ) include:
(1) Adding a fixed constant to DELAY, for example representing the worst case drift between the respective clocks used by the devices A and B to compute the transmission delay. This may involve adding a fixed value to DELAY while MEASURED is greater than DELAY, and otherwise setting DELAY equal to MEASURED. The value added by f( ) is preferably prevented from being negative.
(2) Adding a positive value to DELAY that increases on each cycle while MEASURED is greater than DELAY, and otherwise setting DELAY equal to MEASURED. If MEASURED is less than or equal to DELAY then the value added by the function f( ) is reduced. The value added by f( ) is prevented from being negative.

Figure 5:
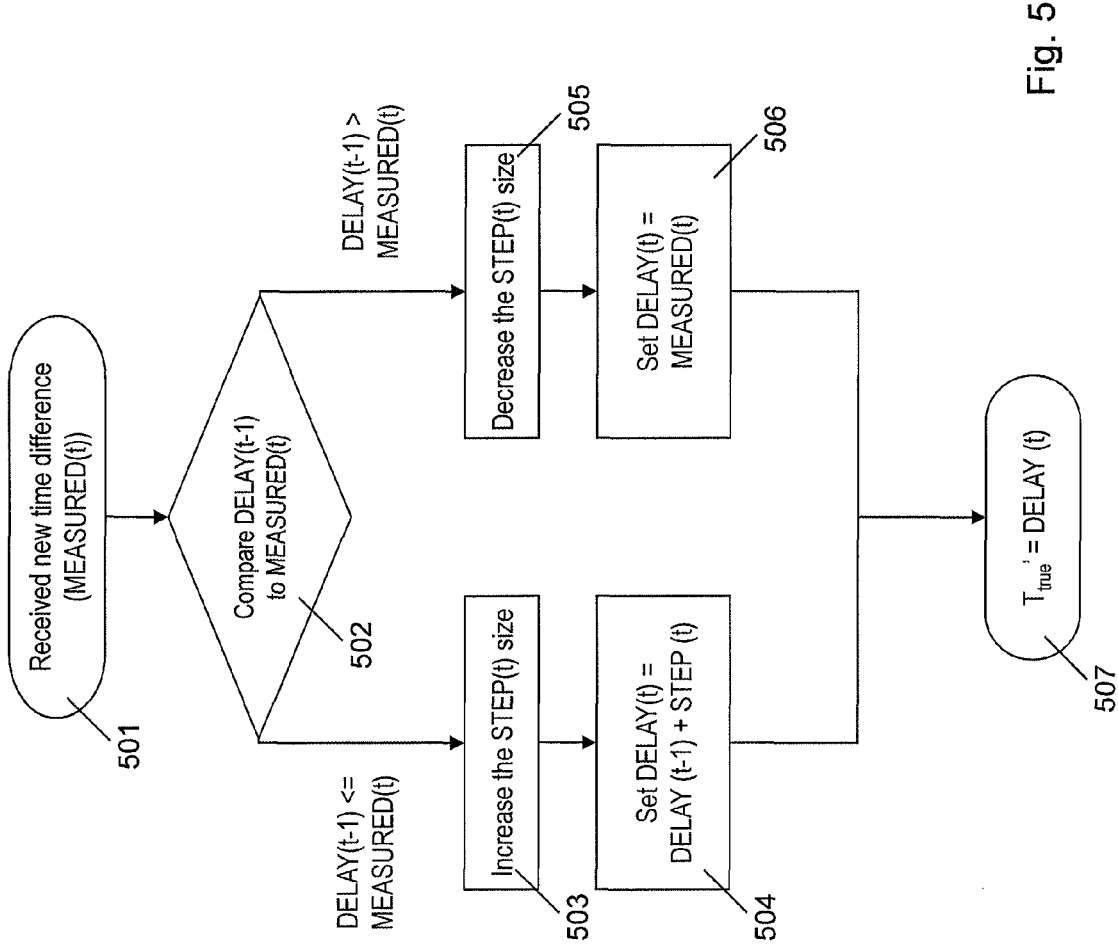
FIG. 5 is a flow chart illustrating a second method of calculating transmission delay embodying one aspect of the invention.

The method is illustrated in FIG. 5 with option (2), where for a new measured delay value (MEASURED(t)) is taken at time t (501), its value is compared with the existing value for DELAY (502). If the measured value is greater than or equal to the value for DELAY, then the size of a step function is increased (503) after which the step function is applied to the existing value of DELAY, i.e. the step value is added to the DELAY value (504) to provide a new value for DELAY. If the measured value is less than the current value for delay, then the size of the step function is decreased (505) following which the new value for DELAY is set as the new measured delay value (506). In either case, the new value for DELAY is the estimated value for $T_{true}$. To implement option (1) above, steps 503 and 505 are removed.

Figure 6:
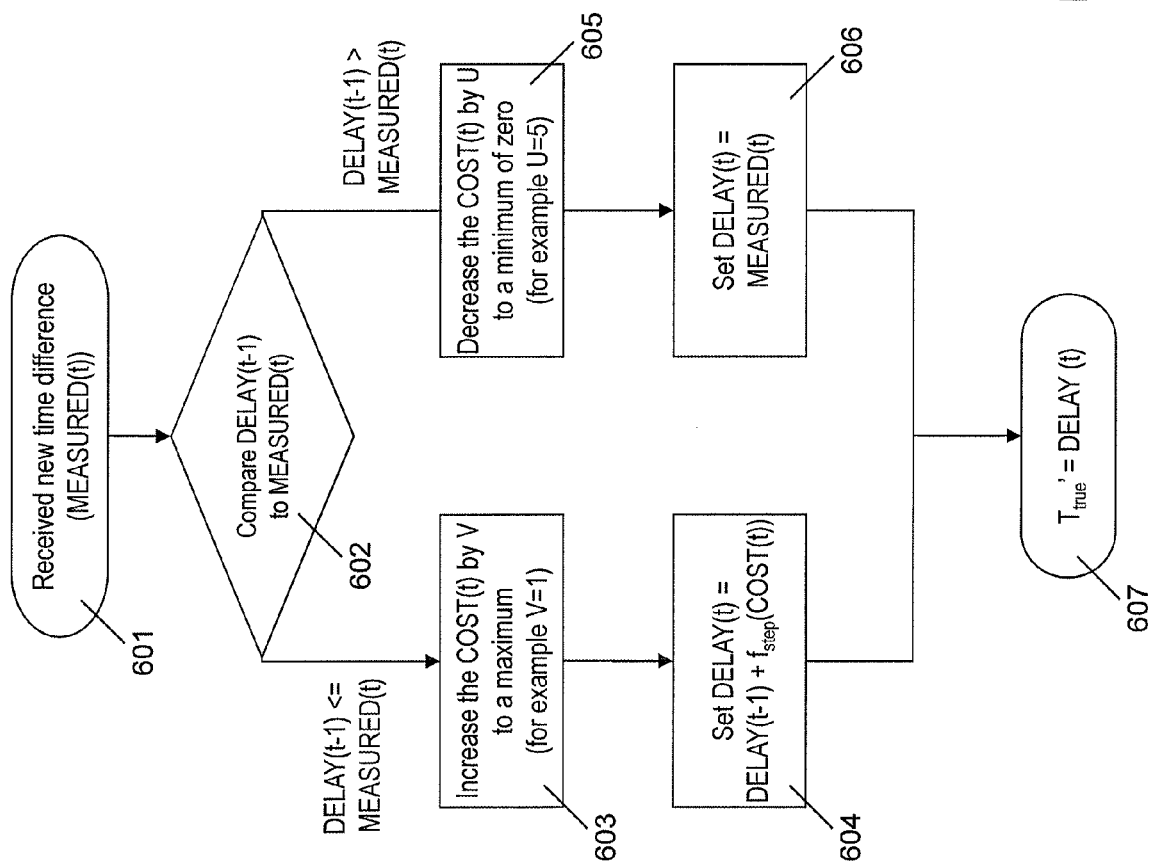
FIG. 6 is a flow chart illustrating a third method of calculating transmission delay embodying one aspect of the invention

FIG. 6 shows a variation of the method of FIG. 5 in which like numerals 601 to 607 are used to denote like steps, and wherein a minimum and a maximum value are assigned to the amount of the step value (COST) in steps 603 and 605.

In a variation of the methods above, the fixed or increasing positive value is added to DELAY while MEASURED is greater than or equal to DELAY, the other logical path being following if MEASURED is less than DELAY.

A further method for tracking, or detecting, a bottom envelop of measured transmission delay is to determine a set of values for the minimum transmission delay, each conveniently being measured in respective of a respective relatively short period of time, and from the resulting set of computed minimum delay values, to create a model from which the true transmission delay ($T_{true}$) can be estimated, e.g. by fitting a curve to the computed minimum delay values. The period of time may be equal to or otherwise derived from the value of $T_{age}$.

Computing the minimum transmission delay over a short period of time can be done using a number of methods, for example by use of a local minimum algorithm, or by finding the minimum in a sliding time window.

When applying the methods of finding the envelope, minimizing the effects on the measured data of the drift d can improve speed and reduce errors. This may be achieved by calculating the minimum values relative to a reference value. The reference value can be defined in any suitable way, for example: a fixed value (i.e. just the minimum value); a running average of previously measured delay values (which may be regarded as a trend value representing the drift between the timer instruments used to measure the transmission delay); or a linear equation computed using rate of change between previous valid minimum values. In this way the measured delay values can be modified to remove or at least reduce the effect of the drift d.

Fitting a curve, or otherwise devising a model, that represents true transmission delay ($T_{true}$) from the set of computed minimum delays can be done in numerous ways, for example:
  Using a line-matching algorithm on the set of points (minimum values) to extract a linear equation which best fits the set of points. An iteration process can be used to find out the best equation. At each iteration all points above the line may be removed and the computation of a new line can be performed until all points are within a defined distance from the line
  Extracting a linear equation using two points in the set. An iteration process can be used to find out the best equation. At each iteration all points above the line may be removed and the computation of a new line can be performed until all points are within a defined distance from the line
  Extracting a linear equation that has a relatively close slope from the previous valid equation. An iteration process can be used to find out the best equation. At each iteration all points above the line can be removed and the computation of a new line can be performed until all points are within a defined distance from the line
  Extract a line between two points in the set.
  Extract a line matching the trend of the drift between the timer instruments (clocks) used to measure the delay (for example a running average using previously stored delay data). At each iteration all points above the line may be removed and the computation of a new line can be performed until all points are within a defined distance from the line Where a linear equation or model is used to estimate $T_{true}$, ($T_{network} + C$) and d can be calculated in the same manner described above with reference to FIG. 4.

It will be apparent that each of the methods described above involve processing a set of data values in order to detect an envelope that represents a minimum boundary (which may alternatively be referred to as a lower or bottom boundary or edge) of the data values. This has the effect of (low pass) filtering the data values to remove noise caused by, in the present example, disruption such as jitter. The envelope may be defined as a set of data values, which may for example be a subset of the measured data values (e.g. the inflection points), or a set of values derived from the measured data values (e.g. computed minimum values). The envelope may alternatively be defined by a variable parameter (e.g. DELAY) that is updated in respect of successive measured values being taken. The concept of envelope detection may also be regarded as envelope tracking.

If one device 12 is supplying the time provided by its clock to other devices 12, it is considered to host the master clock. The master clock can suffer from a drift relative to another reference clock and this drift can change over time. The clock drift can have many causes, for example temperature change or voltage change. The reference clock can be generated by any other timer instrument and is only required to not suffer from a sudden change of drift relative to a perfect timer instrument. A perfect timer instrument is one that provides a near perfect time (like an atomic clock for example). Note that the reference timer can be derived through any method provided it respects the attribute previously defined.

A slave device 12 trying to measure the communication delay between itself and the master device 12 must be able to track the drift between its own timer instrument and the timer instrument used by the master device. As seen previously a number of methods have been described to accurately estimate this drift. To further improve the accuracy it is desirable for the slave device 12 to be able to know when a master device's timer instrument is changing its rate of drift related to a reference clock.

If the communication network through which the devices 12 communicate is suffering from jitter or noise on the connections for more than a few seconds and the master timer instrument drift (in relation to the reference clock) is changing during that period by, say, a few ppm (parts per million) then the estimated drift between the master timer instrument and the slave timer instrument can quickly diverge from the effective drift as the slave has no way of differentiating between network jitter and the change in drift. An example of this can be seen in FIG. 3 where E(1,4) represents the "old" drift of the master clock and this is not corrected until t=12 or 13.

In preferred embodiments of the invention, a reference clock (as defined above) is available on the master device 12 to detect when the master clock drift from the reference clock is changing and to supply the detected change to the slave devices 12. If the change to the drift of the timer instrument of the master device 12 is known to the master device at the time it occurs (the initial time value for the timer instrument being reset for example), then the change can be sent directly to the slave devices 12 without requiring any computation. The master device may be able to determine that its drift has changed by any other means (e.g. a setting of a register value or a change in the voltage/temperature).

The slave devices 12 can then adjust the drift they have computed using the supplied information. This drift adjustment may be applied immediately in the computation of the estimate of the drift between the master clock and the slave clock.

To reduce the cost of an Audio/Video system, manufacturers quite often ensure only one of the clocks is of good quality (i.e. having very low frequency drift over temperature, voltage and time (typically less than 15 ppm (Part Per Million)). This clock is usually the one driving the audio or video ADC/DAC (Analog to Digital or Digital to Analog Converters).

In such systems the clock driving the main processing unit is usually cheap and of poor stability (e.g. frequency drift usually above 50 ppm over temperature/voltage and time). This clock is also usually multiplied from a few MHz to a few GHz via a PLL or DPLL circuitry and drive key elements of the processing unit including the timers and the processing unit itself. One of these timers is then used as a reference clock for the system.

When a system composed of multiple devices, each hosting a clock, communicating over a network starts, the drift between their clocks is not stable. The initial high drift between the clocks is quite problematic. Indeed it is possible to quickly compute the transmission delay at a given time between the devices but getting a good estimate of the drift between the clocks takes longer and is made difficult when a device initially adjusts its time using methods such as NTP.

A preferred solution to this problem is to use a stable clock found in A/V systems (the clock driven by the crystal used to sample audio or video data). These clocks usually are ideal for reference clocks as they often are characterized by being stable across temperature, voltage and time.

A clock signal may be derived by measuring the number of samples read in the input buffer storing the data sampled by the stable clock on a regular basis. If the resolution (as in the update time) offered by the method is not sufficient, the derived clock resolution can be extended through extrapolation of the measured time. This stable clock can be used as the reference clock handling changes in the master clock drift as described above.

It will be apparent from the foregoing that some embodiments of the invention provide method for finding the bottom envelop of a set of measured data which is robust to noise and suitable for the measurement of transmission delay between multiple devices communicating across any network (wired/wireless, Noisy/Clean). This facilitates achieving a high level of accuracy (e.g. down to 1 sample accuracy) in synchronizing the rendering of audio, for example, in a wireless network with high level of noise or jitter. Systems embodying the invention can exhibit relatively high robustness and accuracy in a noisy communication environment often found in wireless network.

The invention is not limited to the embodiments described herein which may be modified or varied without departing from the scope of the invention.

The invention claimed is:

1. A method of calculating a transmission delay value for data transmitted from a first device to a second device across a communications link, the method comprising:
    calculating, by a processor, a plurality of measured values representing the transmission delay value measured by the second device over time;
    detecting, by the processor, a boundary of the plurality of measured values by determining a plurality of boundary values including a sub-set of the plurality of measured values by:
        calculating a first rate of change between a first measured value taken at a first time and a second measured value taken at a second time preceding the first time,
        calculating a second rate of change between the second measured value and a third measured value taken at a third time preceding the second time,
        comparing the first and second rates of change, and
        excluding the second measured value from or including the second measured value in the sub-set depending on the comparison of the first and second rates of change, wherein the boundary comprises at least one of the plurality of boundary values; and deriving, by the processor, the transmission delay value from the at least one of the plurality of boundary values, wherein detecting the boundary involves updating a parameter value in respect of each of the plurality of measured values, wherein updating the parameter value involves setting the parameter value to the lower one of: a current measurement time; and the parameter value modified by application of a mathematical function.

2. The method of claim 1, wherein the first and second devices are co-operable with a respective clock signal, and wherein the method further includes using the transmission delay value to synchronize the clock signal of the second device to the clock signal of the first device.

3. The method of claim 1, further comprising detecting an envelope representing the boundary.

4. The method of claim 1, wherein detecting the boundary involves fitting a model to the plurality of boundary values; and deriving the transmission delay value from the model.

5. The method of claim 4, wherein fitting the model involves fitting a curve to the plurality of boundary values.

6. The method of claim 5, wherein the first and second devices are co-operable with a respective clock signal, and wherein the method further includes determining a value for a drift between the respective clock signals from a gradient of the curve.

7. The method of claim 4, wherein the model is a linear model.

8. The method of claim 1, wherein selecting the sub-set of the plurality of measured values involves selecting at least one measured value representing the transmission delay value measured a time prior to a current time by more than a first threshold amount.

9. The method of claim 8, the first threshold amount is calculated from the plurality of measured values, preferably as being greater than or equal to a time between two measured delay values that are determined to bridge a period of disruption in a transmission of the data from the first device to the second device.

10. The method of claim 1, wherein selecting the sub-set of the plurality of measured values involves excluding all measured values representing the transmission delay value measured a time prior to a current time by more than a second threshold amount.

11. The method of claim 1, wherein selecting the sub-set of the plurality of measured values involves selecting a plurality of the plurality of measured values depending on a rate of change of the plurality of measured values.

12. The method of claim 1, further including: excluding the second measured value from the sub-set if the rate of change between the first measured value and the second measured value is less than the rate of change between the second measured value and the third measured value, otherwise including the second measured value in the sub-set.

13. The method of claim 12, wherein the second measured value is excluded from the sub-set if the rate of change between the first measured value and the second measured value is equal to the rate of change between the second measured value and the third measured value.

14. The method of claim 1, wherein the first time corresponds to the current measurement time.

15. The method of claim 1, wherein the second time corresponds to a measurement time immediately preceding the current measurement time.

16. The method of claim 1, wherein the second time corresponds to a second measurement time and the third time corresponds to a measurement time immediately preceding the second measurement time.

17. The method of claim 1, wherein prior to the calculations of the first and second rates of change, the second measured value and the third measured value each belong to the sub-set.

18. The method of claim 17, wherein the second measured value is a measured value in the sub-set of the plurality of measured values taken at an earlier time closest to the current measurement time.

19. The method of claim 17, wherein the second measured value is a measured value in the sub-set taken at an earlier time closest to the second time.

20. The method of claim 1, wherein the calculations of the first and second rates of change, the comparison of the respective calculated rates of change and the exclusion or inclusion of the second measured value are performed in respective of each new measured value, the new measured value being taken as the first measured value.

21. The method of claim 1, wherein the calculations of the first and second rates of change, the comparison of the respective calculated rates of change and the exclusion or inclusion of the second measured value are repeated each time the second measured value is excluded from the sub-set.

22. The method of claim 1, wherein determining the plurality of boundary values involves calculating each of the plurality of boundary values as a respective minimum value derived from the plurality of measured values.

23. The method of claim 1, wherein determining the plurality of boundary values involves calculating each of the plurality of boundary values as a respective minimum value of a respective subset of the plurality of measured values.

24. The method of claim 1, wherein the plurality of boundary values are calculated with respect to a reference value.

25. The method of claim 24, wherein the first and second devices are co-operable with a respective clock signal and the reference value is calculated to represent a drift between the respective clock signals.

26. The method of claim 1, wherein the mathematical function comprises addition of a step value to the parameter value.

27. The method of claim 26, wherein, when the parameter value is less than the current measurement time, the step value is increased before being added to the parameter value.

28. The method of claim 27, wherein the step value is bounded by a maximum value.

29. The method of claim 26, wherein, when the parameter value is equal to the current measurement time, the step value is increased before being added to the parameter value.

30. The method of claim 26, wherein, when the parameter value is greater than the current measurement time, the step value is decreased.

31. The method of claim 30, wherein, when the parameter value is equal to the current measurement time, the step value is decreased.

32. The method of claim 30, wherein the step value is bounded by a minimum value.

33. The method of claim 1, wherein the boundary is a minimum boundary.

34. The method of claim 1, wherein detection of the boundary involves low pass filtering of the plurality of measured values.

35. The method of claim 1, further including tabulating each measured value against time of measurement and against respective one of the first and second rates of change between the respective measured value and at least one preceding measured value, the at least one preceding measured value comprising the preceding measured value taken closest in time to the respective measured value.

36. The method of claim 35, the at least one preceding measured value comprising a closest preceding measured value taken closest in time to the respective measured value and included in the sub-set.

37. The method of claim 1, wherein the first and second devices are co-operable with a respective primary clock signal, the method further including detecting, at the first device, a change in a value of a drift of the primary clock signal of the first device; and communicating the change in the drift to the second device.

38. The method of claim 1, wherein the first and second devices are co-operable with a respective primary clock signal, and wherein the method further includes providing the first device with a reference clock signal; comparing the primary clock signal of the first device to the reference clock signal to detect a change in drift between the primary clock signal and the reference clock signal; communicating the change in the drift to the second device.

39. The method of claim 1, further including, at the second device, determining from the plurality of measured values a value representing the drift between the respective primary clock signals of the first and second devices; and adjusting the value depending on a detected change in the drift of the primary clock signal of the first device.

40. The method of claim 1, wherein at least one the first and second devices includes a sampling device for sampling an audio or video data signal, the sampling device comprising a buffer for storing data samples, the method further including measuring a number of data samples in the buffer at regular intervals; and generating a clock signal based on the measured number of data samples in the buffer at regular intervals.

41. The method of claim 40, further including using the generated clock signal as a reference clock signal for the first device.

42. The method of claim 1, wherein the plurality of boundary values are calculated from at least one measured value representing the transmission delay value measured a time prior to a current time by more than a first threshold amount.

43. The method of claim 1, wherein the parameter value in respect of each of the plurality of measured values is updated in respect of at least one measured value representing the transmission delay value measured a time prior to a current time by more than a first threshold amount.

44. An apparatus for communicating across a network, the apparatus comprising:
a transmitter;
a receiver; and
a processor coupled to the transmitter and the receiver, wherein the processor is configured with processor-executable instructions to perform operations comprising:
calculating a plurality of measured values representing a transmission delay value measured by the apparatus over time;
detecting a boundary of the plurality of measured values by determining a plurality of boundary values including a sub-set of the plurality of measured values by:
calculating a first rate of change between a first measured value taken at a first time and a second measured value taken at a second time preceding the first time,
calculating a second rate of change between the second measured value and a third measured value taken at a third time preceding the second time,
comparing the first and second rates of change, and
excluding the second measured value from or including the second measured value in the sub-set depending on the comparison of the first and second rates of change, wherein the boundary comprises at least one of the plurality of boundary values; and
deriving the transmission delay value from the at least one of the plurality of boundary values, wherein detecting the boundary involves updating a parameter value in respect of each of the plurality of measured values, wherein updating the parameter value involves setting the parameter value to the lower one of: a current measurement time; and the parameter value modified by application of a mathematical function.

45. A device for communicating across a network, the device comprising:
mean for calculating a plurality of measured values representing a transmission delay value measured by the device over time;
means detect for detecting a boundary of the plurality of measured values by determining a plurality of boundary values including a sub-set of the plurality of measured values comprising:
means for calculating a first rate of change between a first measured value taken at a first time and a second measured value taken at a second time preceding the first time,
means for calculating a second rate of change between the second measured value and a third measured value taken at a third time preceding the second time,
means for comparing the first and second rates of change, and
means for excluding the second measured value from or including the second measured value in the sub-set depending on the comparison of the first and second rates of change, wherein the boundary comprises at least one of the plurality of boundary values; and
means for deriving the transmission delay value from the at least one of the plurality of boundary values, wherein the means for detecting the boundary involves means for updating a parameter value in respect of each of the plurality of measured values, wherein the means for updating the parameter value involves means for setting the parameter value to the lower one of: a current measurement time; and the parameter value modified by application of a mathematical function.

46. A non-transitory computer readable storage medium having stored thereon processor-executable instructions configured to cause a processor to perform operations for calculating a transmission delay value for data transmitted from a first device to a second device, the operations comprising:
calculating a plurality of measured values representing the transmission delay value measured by the second device over time;
detecting a boundary of the plurality of measured values by determining a plurality of boundary values including a sub-set of the plurality of measured values by:
calculating a first rate of change between a first measured value taken at a first time and a second measured value taken at a second time preceding the first time;

calculating a second rate of change between the second measured value and a third measured value taken at a third time preceding the second time;

comparing the first and second rates of change; and excluding the second measured value from or including the second measured value in the sub-set depending on the comparison of the first and second rates of change, wherein the boundary comprises at least one of the plurality of boundary values: and deriving the transmission delay value from the at least one of the plurality of boundary values, wherein detecting the boundary involves updating a parameter value in respect of each of the plurality of measured values, wherein updating the parameter value involves setting the parameter value to the lower one of: a current measurement time; and the parameter value modified by application of a mathematical function.

* * * * *